(12) United States Patent
Brown et al.

(10) Patent No.: US 6,246,369 B1
(45) Date of Patent: Jun. 12, 2001

(54) MINIATURE PHASED ARRAY ANTENNA SYSTEM

(75) Inventors: Alison K. Brown; Peter K. Brown; Amir H. Matini; John D. Norgard, all of Colorado Springs, CO (US)

(73) Assignee: NAVSYS Corporation, Colorado Springs, CO (US)

( * ) Notice: Subject to any disclaimer, the term of this patent is extended or adjusted under 35 U.S.C. 154(b) by 0 days.

(21) Appl. No.: 09/395,550

(22) Filed: Sep. 14, 1999

(51) Int. Cl.[7] ........................................... H01Q 3/02
(52) U.S. Cl. ................................... 343/700 MS; 343/753
(58) Field of Search ................................... 343/753, 755, 343/700 MS, 911 R, 911 L, 872, 701, 786, 840, 754

(56) References Cited

U.S. PATENT DOCUMENTS

| | | | | |
|---|---|---|---|---|
| 3,755,815 | * | 8/1973 | Stangel et al. | 343/100 SA |
| 4,755,820 | * | 7/1988 | Backhouse et al. | 343/700 MS |
| 5,706,017 | * | 1/1998 | Buttgenbach | 343/753 |
| 5,781,163 | * | 7/1998 | Ricardi et al. | 343/911 R |
| 5,835,062 | * | 11/1998 | Heckaman et al. | 343/700 MS |
| 6,011,524 | * | 1/2000 | Jervis | 343/895 |

* cited by examiner

Primary Examiner—Don Wong
Assistant Examiner—Chuc D Tran
(74) Attorney, Agent, or Firm—William E. Hein

(57) ABSTRACT

A miniature phased array antenna system employs a substrate having a high dielectric constant. A plurality of antenna elements are located on a surface of the substrate, and a superstrate having a high dielectric constant covers the antenna elements. The dielectric constant, thickness, and shape of the superstrate enable it to act as a dielectric lens for controlling the phase relationship of a signal received by the antenna elements. The design of the superstrate dielectric lens permits a reduction in the physical spacing between the antenna elements while maintaining spatial diversity in phase between signals arriving from different directions. Thus, the antenna array may be significantly smaller than conventional phased array antennas while maintaining a similar phase relationship to that achieved using conventional phased array antennas. Electronic circuitry coupled to each of the plurality of antenna elements applies complex weights to received signals prior to a summation thereof in order to reconstruct a desired signal and to deconstruct an undesired signal. SAW filters employed in the electronic circuitry are temperature controlled to maintain group-delay and phase-offset stability.

19 Claims, 6 Drawing Sheets

MINIATURE PHASED ARRAY ANTENNA SYSTEM

GOVERNMENT SUPPORT

This invention was made with United States Government support under grants awarded by the Office of Naval Research. The Goverment has certain rights in this invention.

FIELD OF THE INVENTION

The present invention relates generally to the field of antennas and more particularly to a miniature phased array antenna.

BACKGROUND AND SUMMARY OF THE INVENTION

Phased array antennas are used in a variety of aerospace applications. A phased array antenna has a number of antenna elements that are aligned in phase to provide transmit or receive gain. By adjusting the amplitude and phase of the input signals from the different antenna elements using complex weights, interference sources can be isolated and rejected from the composite signal and the desired signal can be reinforced. One application for this isolation is use the phased array to eliminate interference sources for GPS (Global Positioning Satellite) receivers or to increase the received signal power through beam steering to the GPS satellites. There has been interest in using GPS for commercial aircraft navigation. However there are concerns about low power interference sources. A phased array antenna can be used to isolate these interference sources. The number of sources that can be isolated is related to the number of elements in the phased array. To obtain spatial diversity, the antenna elements need to be spaced so that the received signals are separated by one half cycle in phase. This means that the larger the number of elements the more space the phased array antenna requires. Since space in most aerospace application is at a premium, this has meant that the majority of installations only include a single antenna element which does not allow for spatial processing to isolate and reject interference sources.

Thus, there exists a need for a phased array antenna that is smaller than conventional phased array antennas while having the same number of elements and phase relationship between elements to provide spatial diversity for interference rejection.

In previous antenna designs, the size of the antenna element has been reduced through the use of a high dielectric substrate material. The size of the element is approximately equal to $\lambda/2$ by $\lambda/2$ inside the substrate material. However, this method does not reduce the over-all size of the antenna array as the antenna elements must be separated by the free-space $\mu/2$ to maintain the spatial diversity needed for interference rejection.

It would therefore be advantageous to provide a miniature phased array antenna system to reduce the over-all size of the array by using a high dielectric lens to maintain the signal spatial diversity between antenna elements while reducing the physical separation, and by using digital array phase-shifting electronics to reduce the size of the phased array antenna electronics.

In accordance with the illustrated preferred embodiment of the present invention, the miniature antenna employs a substrate having a high dielectric constant. A plurality of antenna elements are located on a surface of the substrate. A superstrate covers the antenna elements. The superstrate has a high dielectric constant, which reduces the physical size of a wave length of electromagnetic energy at the design frequency. The dielectric constant, thickness, and shape of the superstrate enable it to act as a dielectric lens for controlling the phased relationship of a signal received by the antenna elements. The design of the superstrate dielectric lens permits a reduction in the physical spacing between the antenna elements while maintaining spatial diversity in phase between signals arriving from different directions. This enables the antenna array to be made significantly smaller than conventional phased array antennas while maintaining a similar phase relationship to that achieved using conventional phased array antennas. Electronic circuitry coupled to each of the plurality of antenna elements applies complex weights to received signals prior to a summation thereof in order to reconstruct a desired signal and to deconstruct an undesired signal. Surface acoustic wave (SAW) filters employed in the electronic circuitry are temperature controlled to maintain group delay and phase stability.

DETAILED DESCRIPTION OF THE PREFERRED EMBODIMENT

The present invention is a miniature antenna having a substrate with a high dielectric constant. A number of antenna elements are located on a surface of the substrate. A superstrate covers the antenna elements. The superstrate has a high dielectric constant, which reduces the physical size of a wavelength of electromagnetic energy at the design frequency. The dielectric constant, thickness and shape of the superstrate enable it to act as a dielectric lens for controlling the phase relationship of a signal received by the antenna elements. The design of the superstrate high dielectric lens permits a reduction in the physical spacing between the antenna elements while maintaining spatial diversity in phase between signals arriving from different directions. This enables the antenna array to be made significantly smaller than conventional phased array antennas while maintaining a similar phase relationship to that achieved using conventional phased array antennas.

Figure 1:
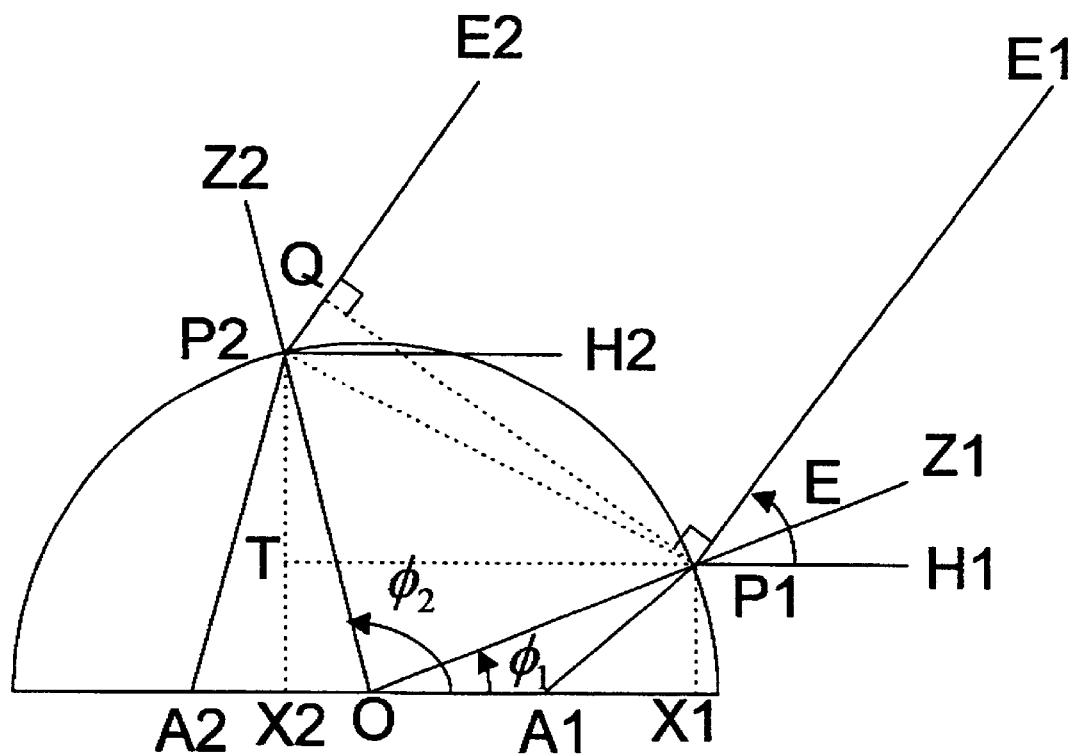
FIG. 1 is a pictorial diagram of a dielectric lens comprising a hemisphere constructed of material having a uniform high dielectric constant, in accordance with the preferred embodiment of the present invention.

Referring now to FIG. 1, there is shown one embodiment of a dielectric lens which comprises a hemisphere constructed of material with a uniform high dielectric constant. Other embodiments are possible, including a Fresnel lens having a non-uniform dielectric constant in the superstrate, and including lenses of different shapes and lenses constructed using varying dielectric constants to produce a similar effect on the phase relationship between the antenna elements. The refractive index (n) of a superstrate is equal to the square root of the dielectric constant ($\epsilon$) ($n=\sqrt{\epsilon}$). Within the superstrate, the wavelength of the GPS signal is reduced, proportional to the refractive index $$(\lambda_s = \lambda/n).$$

The total phase change between the antenna elements can be computed from their path differences, scaled by the wavelength of the signal. By normalizing all dimensions to the free-space wavelength ($\lambda$), the following expression can be derived for the phase angle difference in the mini-array:

$$\Delta\theta = \theta_2 - \theta_1 = \frac{P_2Q}{\lambda} + \frac{A_2P_2}{(\lambda/n)} - \frac{A_1P_1}{(\lambda/n)}$$

The distances ($P_2Q$, $A_2P_2$ and $A_1P_1$) can be computed by solving for the ray tracing geometry shown in FIG. 1. Using Snell's Law, the angle of incidence ($\angle EPZ$) is related to the angle of refraction within the superstrate ($\angle OPA$), as illustrated in FIG. 1 through the following equation:

$$n = \frac{\sin(\angle EPZ)}{\sin(\angle OPA)}$$

With this high dielectric lens configuration, the phase difference between the antenna elements closely approximates the phase difference for a full size antenna array with half wavelength separation ($\lambda/2$) when the antenna element spacing is reduced by the refractive index ($\lambda/2n$)

Figure 2:
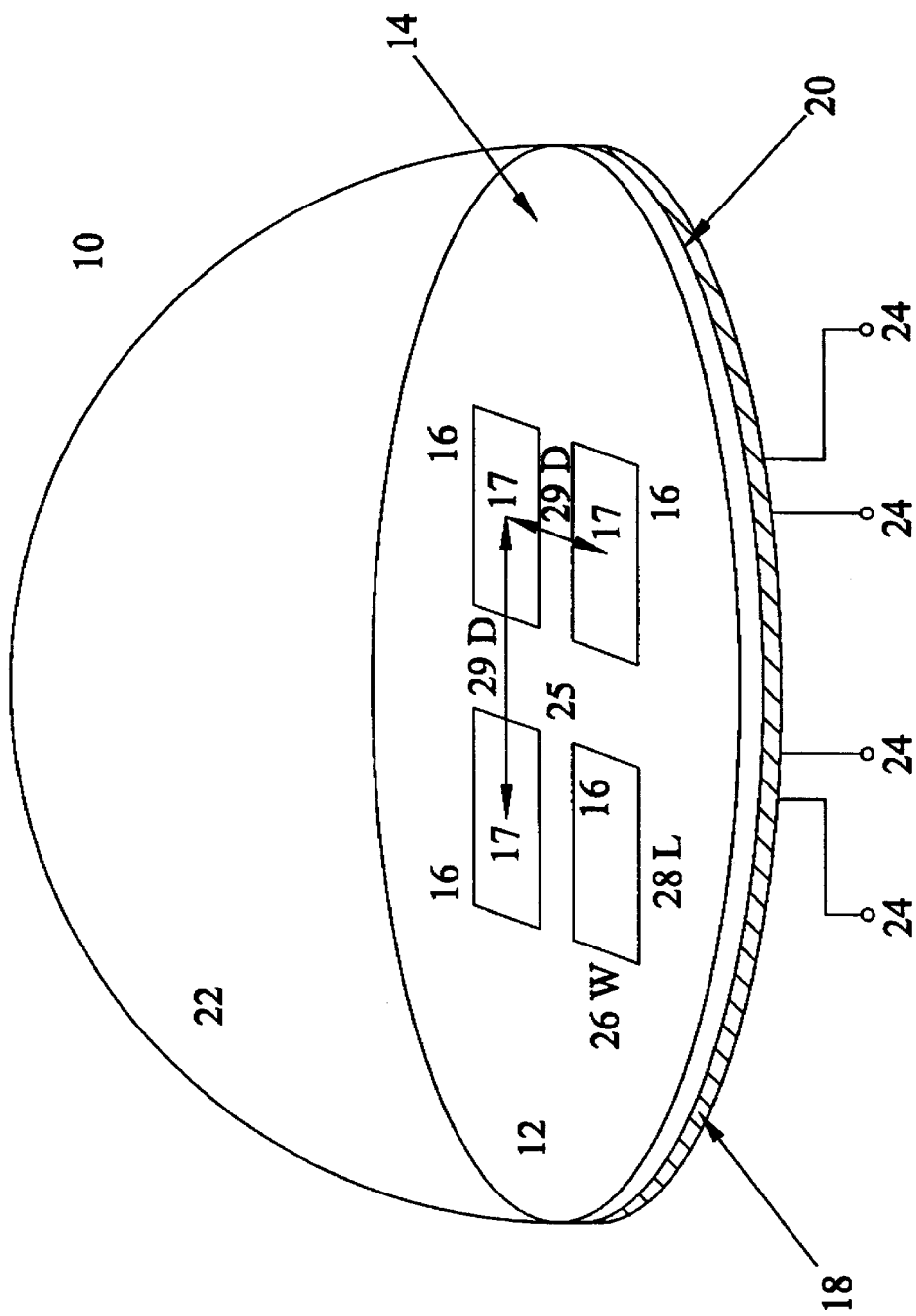
FIG. 2 is a pictorial diagram of a 4-element miniature phased array antenna, in accordance with the preferred embodiment of the present invention.

Referring now to FIG. 2, there is shown a perspective view of a 4-element miniature phased array antenna 10 in accordance with one embodiment of the present invention. Other embodiments are possible using different numbers of antenna elements and high dielectric lens designs. A substrate 12 has a first side 14 on which a plurality of antenna elements 16 are constructed to form the phased array 25. The antenna elements have a width W 26 and a length L 28. The spacing between the centers 17 of the antenna elements 16 is shown as D 29. In one embodiment, the plurality of antenna elements are mounted on the substrate 12. A metal ground plane 18 is formed on a second side 20 of the substrate 12. The received GPS signals are passed to antenna electronics through a plurality of antenna element outputs 24. The substrate 12 has a high dielectric constant. In one embodiment, the substrate 12 is made of TMM10i by Rogers Corporation, a hydrocarbon ceramic, and has a dielectric constant of 9.8. A superstrate 22 is placed over the plurality of antenna elements 16. The superstrate 22 is shown as a hemispherical lens, but other shapes and types of dielectric lenses are possible. The superstrate 22 has a high dielectric constant. In one embodiment, the superstrate 22 is made of C-Stock 265 by Cumming Corporation, an artificial dielectric, having a dielectric constant of 5.0. The superstrate 22 is commonly bolted to the substrate 12 or a base holding the substrate 12.

In the embodiment shown in FIG. 2, the substrate 12 has a larger dielectric constant than that of the superstrate 22. The dielectric constant of the substrate 12 further reduces the physical length of a wavelength at the design frequency. This allows the antenna elements 16 to be further reduced in size. In the embodiment shown in FIG. 2, the antenna elements 16 are microstrip patch antenna elements. These patch antenna elements are approximately square, having a width of one-half a wavelength at the design frequency in the substrate 12. The wavelength is reduced approximately by the square root of the dielectric constant. Thus, the width of each antenna element is approximately one third its size in free space when TMM10i material is used as the substrate 12. For instance, at a GPS frequency of 1.57542 GHz, the free space wavelength is 0.1904 meters (7.5 inches) and the substrate wavelength is 0.0608 meters (2.4 inches). As a result, the width of the patch antenna in free space would have to be around 0.0952 meters, while in the substrate 12 the width of the patch antenna is around 0.0304. In the embodiment shown in FIG. 2, the patch antenna has a width of 2.81 cm and a length of 2.72 centimeters. The reason for the difference has to do with extending the bandwidth of the patch antenna so that it accommodates the bandwidth of the signal and manufacturing tolerances of the patch antenna. In the embodiment shown in FIG. 2, the patch antenna elements 16 are formed on the substrate 12 using standard photo-chemical etching techniques that are well known in the semiconductor industry.

The superstrate 22 has a dielectric constant that is lower than the dielectric constant of the substrate 12. This has the beneficial effect of reducing the mutual coupling between the antenna elements 16. In addition, the dielectric constant of the superstrate 22 determines the physical spacing between the centers of the antenna elements 16. In the embodiment shown in FIG. 2, the spacing is one-half of a wavelength at the design frequency in the superstrate 22. The wavelength is reduced by approximately the square root of the dielectric constant. In the embodiment given above, the superstrate 22 has a dielectric constant of 5.0, thereby allowing the antenna elements to be approximately twice as close together as in free space. This permits a reduction in the overall area of the antenna by approximately a factor of five compared to a free space antenna design. For instance, at the GPS frequency of 1.57542 GHz, the free space wavelength is 0.1904 meters (7.5 inches) and the superstrate wavelength is 0.08515 meters (3.35 inches). As a result, the spacing between antenna elements in free space would have to be around 0.0952 meters, while using the superstrate 22 permits the spacing of the patch antennas to be around 0.04257 meters.

In the embodiment shown in FIG. 2, the shape of the dielectric lens provided by the superstrate 22 preserves the free space phase relationship between the plurality of antenna elements 16. Preserving the free space relationship between the plurality of antenna elements 16 is necessary in order to maintain null-depth on interfering sources.

Note that while the invention is being described as employing four antenna elements 16, any number of antenna elements may be used. While microstrip patch antenna elements are described, other types of antenna elements such as printed dipole or printed spiral antenna elements may be employed instead.

Figure 3:
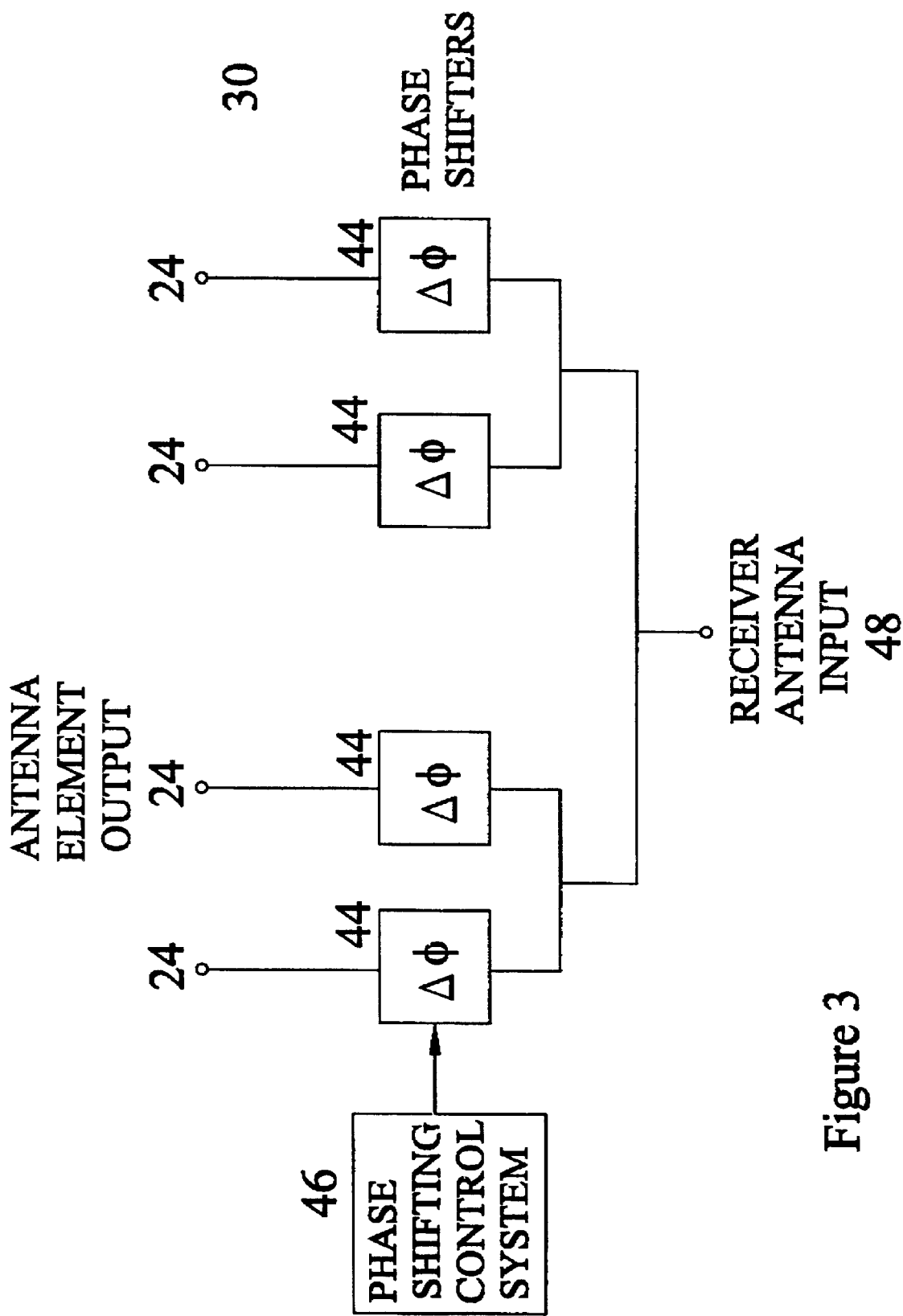
FIG. 3 is a block diagram of analog phase shifting electronics employed with the miniature phased array antenna of FIG. 2.

Referring now to FIG. 3, there is shown a block diagram of an analog antenna electronics module 30 in accordance with one embodiment of the invention. A plurality of phase shifters 44 applies a complex weight ($w_i$) to each antenna element output signal ($s_i$) received at antenna element output 24. The phase shifters 44 are controlled by a phase shifting control system 46. The outputs of the multiple phase shifters 44 are combined to form a composite signal y(t) and connected to a receiver antenna input 48. The composite signal from receiver antenna input 48 may be expressed through the following equation, where N is the number of signals from antenna element outputs 24.

$$y(t) = \sum_{i=1}^{N} w_i(t)s_i(t)$$

By adjusting the complex weights applied by the analog phase shifters 44, the antenna electronics module 30 allows the antenna to null interference sources and/or apply gain through beam steering in the direction of desired signal sources. The signal from the receiver antenna input 48 is provided to the antenna input of a conventional receiver for processing.

Figure 4:
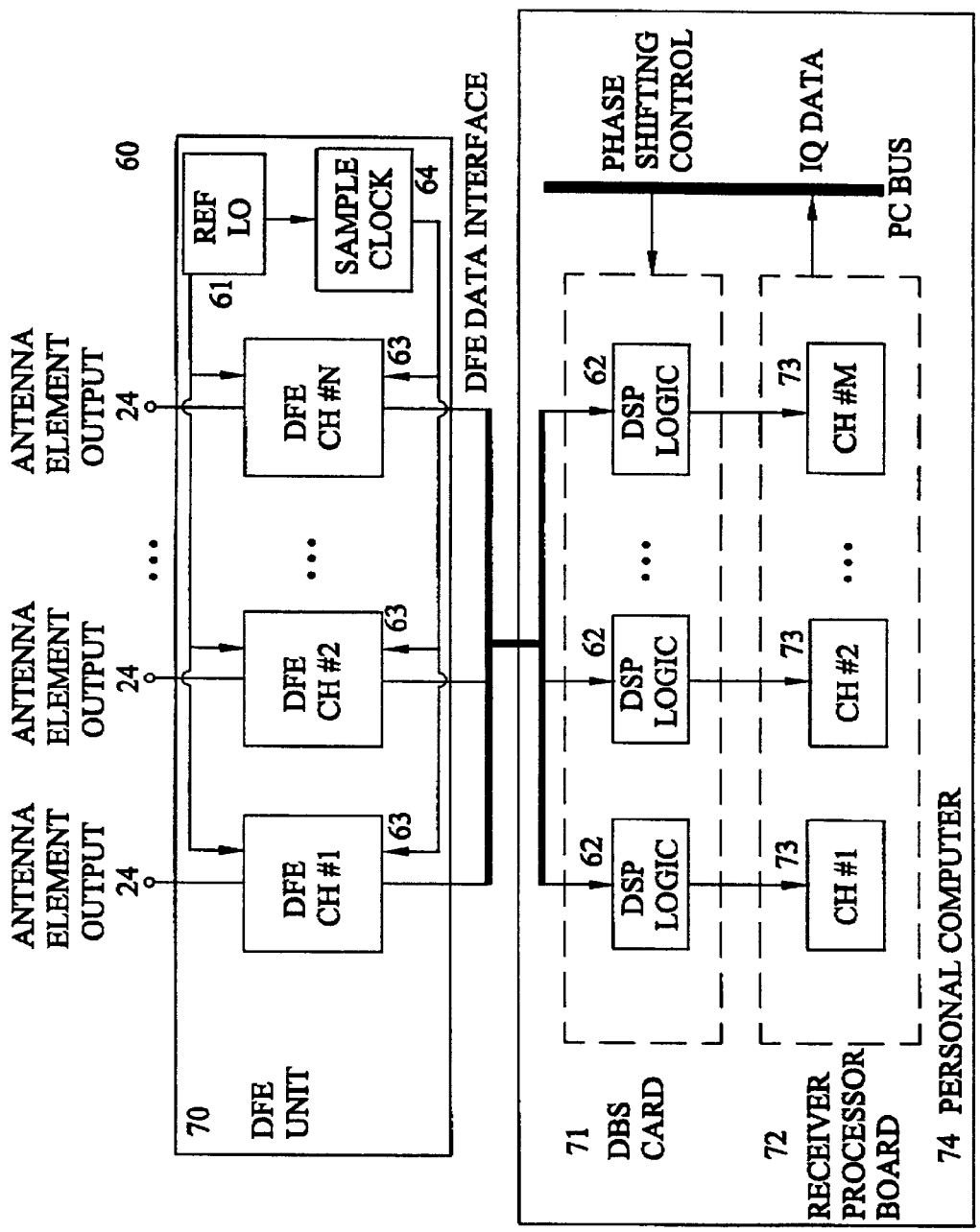
FIG. 4 is a block diagram of digital phase shifting electronics employed with the miniature phased array antenna of FIG. 2.

The miniature phased array antenna electronics module 30 can be reduced in size through the adoption of digital phase shifting electronics. Referring now to FIG. 4, there is shown a block diagram of a digital phased array antenna electronics module 60 in accordance with one embodiment of the invention. Phased array antenna electronics module 60 consists of a digital front end (DFE) unit 70, a digital beam steering (DBS) card 71, and a receiver processor board 72. The DBS card 71 and receiver processor board 72 reside inside a personal computer 74 and are controlled by a software program through the computer data bus.

A plurality of DFE channels 63 within DFE unit 70 convert the analog signals from each of the antenna element outputs 24 to a digital sampled signal ($s_i(t)$). Each of the DFE channels 63 operates from a common reference local oscillator (REF LO) 61 and a common sample clock 64 which is synchronized to local oscillator 61. The outputs from the plurality of DFE channels 63 are passed to the DBS card 71 where the digital phase shifting is applied.

The DBS card 71 shown in FIG. 4 uses digital signal processing (DSP) logic blocks 62 to apply complex weights to the input digital signals and to form a digital summation to provide the composite complex digital output signals $y_j(t)$ to each of a plurality of channels 73 of the receiver processor board 72. The digital signal processing logic allows individual weights ($w_{ij}$) to be applied to optimize the digital output $y_j(t)$ for each of the individual receiver channels 73 as shown in the following equation.

$$y_j(t) = \sum_{i=1}^{N} w_{ji}(t)s_i(t)$$

The DSP logic blocks 62 operate under control of the personal computer 74 which is employed to provide the complex weights to adjust the antenna array pattern in order to track the GPS satellites as they move across the sky, to apply calibration corrections to compensate for offset between the individual antennas and DFEs, or to apply nulling in the direction of a GPS interference source. The individual complex weights assigned to each DSP logic block 62 and each receiver processing channel 73 allow the phased array antenna pattern to be optimized for each GPS satellite to be tracked by the receiver processor board 72. The use of digital electronics allows the phased array antenna electronics module 60 to compensate for amplitude and phase distortions caused by the superstrate 22 to further optimize the antenna array performance.

Figure 5:
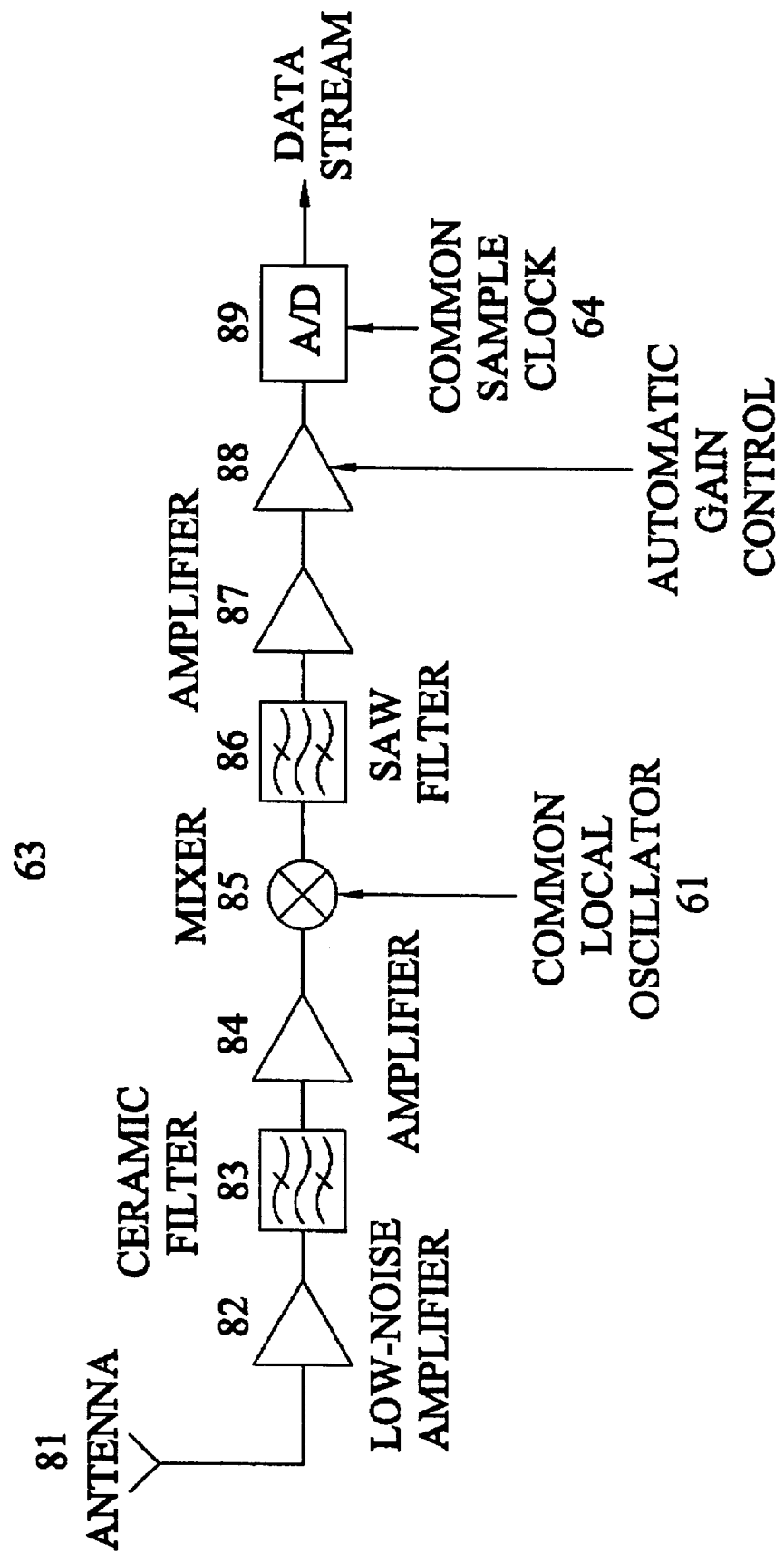
FIG. 5 is a block diagram of the digital front end (DFE) unit of the digital phase shifting electronics shown in FIG. 4.

Referring now to FIG. 5, there is shown a block diagram of circuitry comprising one of the digital front end (DFE) channels 63 used to digitize the received analog signals from the antenna element outputs 24 in accordance with one embodiment of the present invention. The functions of the DFE channels 63 are to down-convert the GPS signals from radio frequency (RF) to intermediate frequency (IF) and to sample and convert the analog IF signal into a digital data stream. The GPS signals received at the antenna 81 are passed through a low-noise amplifier 82, a ceramic filter 83, and another amplifier 84 to mix at a mixer 85 with coherent signals generated by a common local oscillator 61. The mixed and down-converted signals are then passed through a surface acoustic wave (SAW) filter 86 to form the IF frequency signals. The IF signals are then passed through an amplifier 87, an automatic gain control stage 88 which is operated under control of the personal computer 74 to set the correct levels for an analog to digital (A/D) converter 89. The output of the A/D converter 89 is a sampled digital data stream that represents the digitized GPS data signals from each antenna element output 24, $s_i(t)$.

The digital phase shifting design referred to above requires that the relative group-delay and carrier phase-offset be maintained at a constant value (post-calibration) between all of the different DFE channels 63. In the preferred embodiment of the present invention, this stability is achieved in the signal digitization process performed by each of the DFE channels 63 through temperature control of the critical filter components. In an alternative embodiment, this stability is achieved through temperature control of the complete DFE channel 63.

Without temperature control, the SAW filter 86 can introduce significant variations in the group-delay/phase-offset between the different DFE channels 63 which will degrade the ability of the DSP logic 62 to reconstruct the desired composite signals. In the preferred implementation, each of the individual SAW filters 86 in each DFE channel 63 is enclosed in a temperature controlled oven which uses a simple feedback control circuit to heat the SAW filter to a preset fixed temperature.

Figure 6:
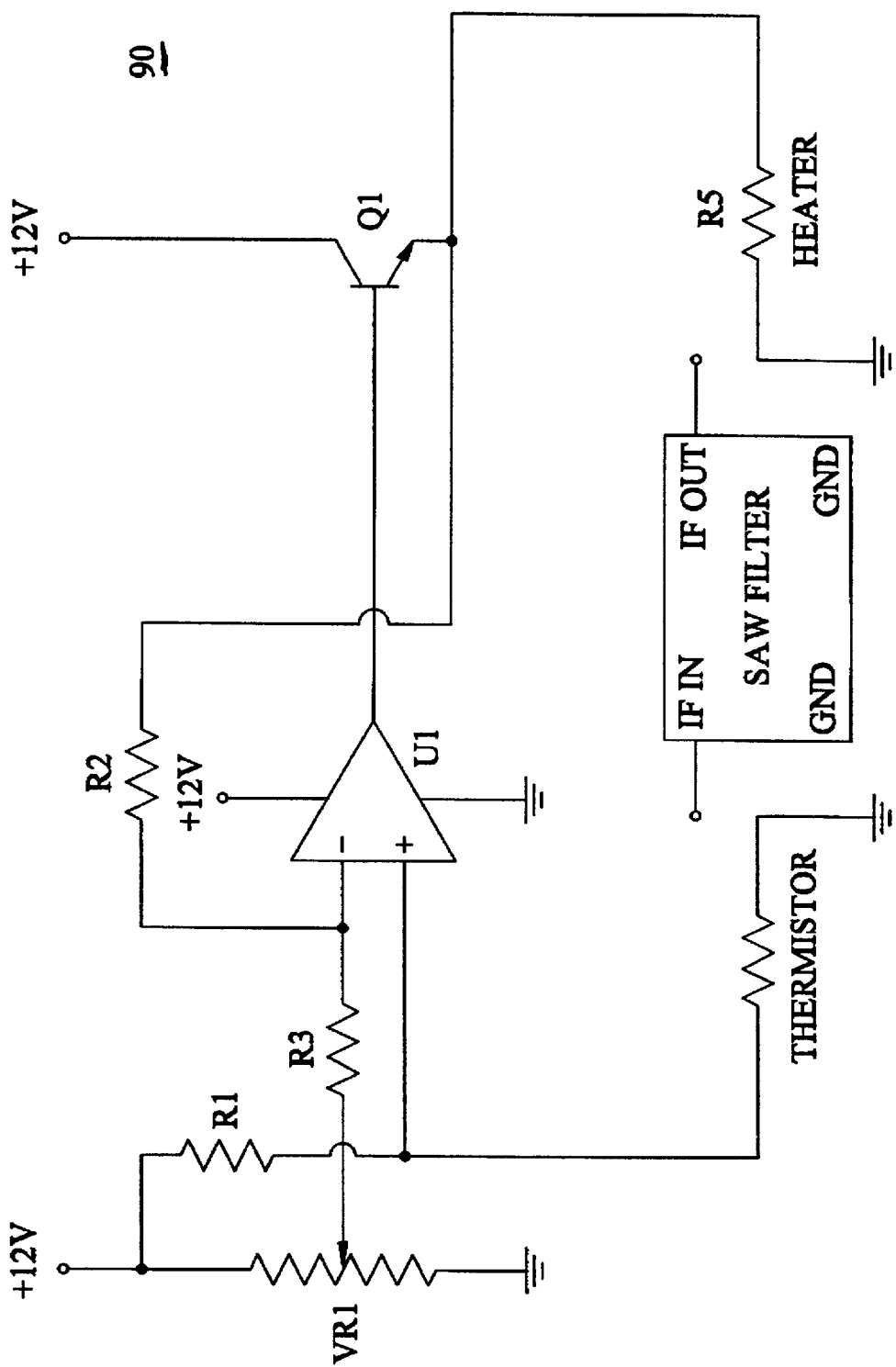
FIG. 6 is a detailed schematic diagram of a temperature controller employed with the DFE unit shown in FIG. 5.

Referring now to FIG. 6, there is shown a schematic diagram of a SAW filter temperature controlled oven 90 in accordance with one embodiment of the invention. Temperature control of SAW filter 86 is achieved by means of a feedback control circuit using a high-gain operational amplifier U1, with the temperature set point defined by a potentiometer VR1. The output of amplifier U1 is applied to the base of an NPN power transistor Q1, the emitter of which drives a heater resistor R5 when turned on. Feedback to the inverting input of amplifier U1 is taken via a resistor R2 from the emitter of transistor Q1 to compensate the transistor's base-emitter voltage drop. Temperature sensing is achieved by means of a negative temperature coefficient thermistor biased by a resistor R1. The mid-point voltage of these two components is applied to the positive input of the operational amplifier U1. The circuit will drive a current through the heater resistor R5, heating the SAW filter, until the potential across the combination of the thermistor and resistor R1 equals the set point potential of potentiometer VR1. Both the thermistor and the heater resistor R5 are attached, by gluing, for example, to the metal SAW filter can for optimum thermal contact. In this way, the SAW filters 86 can all be held at a constant temperature above any expected in-chassis ambient temperature both during initial system calibration and during operation, rendering the fixed group-delay/phase-offset values determined during calibration valid, independent of subsequent equipment temperature changes.

The invention described above reduces the size of a phased array antenna and its electronics. This allows the designer to place a phased array in aerospace applications where only a single element antenna would fit before. In addition, it allows the designer the ability to place more elements in the phased array than previously permitted by any size constraints.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A miniature phased array antenna system comprising:
   a dielectric substrate having a plurality of antenna elements formed on a first surface thereof and having a metallic ground plane formed on a second surface thereof; and
   a superstrate covering the plurality of antenna elements, said superstrate forming a dielectric lens;
   the dielectric constant of the substrate being higher than the dielectric constant of the superstrate.

2. A miniature phased array antenna system as in claim 1 wherein said dielectric substrate is of uniform thickness.

3. A miniature phased array antenna system as in claim 1 wherein the size of said antenna elements is inversely proportional to the square root of the dielectric constant of said substrate.

4. A miniature phased array antenna system as in claim 1 wherein a separation between said plurality of antenna elements is inversely proportional to the square root of the dielectric constant of said superstrate.

5. A miniature phased array antenna system as in claim 3 wherein a separation between said plurality of antenna elements is inversely proportional to the square root of the dielectric constant of said superstrate.

6. A miniature phased array antenna system as in claim 1 wherein said superstrate is formed to preserve a free space phase relationship between said plurality of antenna elements over a design field of view.

7. A miniature phased array antenna system as in claim 1 wherein said superstrate is formed in the shape of a hemisphere.

8. A miniature phased array antenna system as in claim 1 wherein said superstrate comprises a material having a uniform dielectric constant.

9. A miniature phased array antenna system as in claim 1 wherein said superstrate comprises a material having a uniform dielectric constant.

10. A miniature phased array antenna system as in claim 1 wherein a width of each of said plurality of antenna elements is substantially equal to one-half wavelength at the design frequency in the substrate.

11. A miniature phased array antenna system as in claim 1 wherein a separation between centers of said plurality of antenna elements is substantially equal to one-half wavelength of a received signal divided by the square root of the dielectric constant of said superstrate.

12. A miniature phased array antenna system as in claim 1 wherein said superstrate comprises a Fresnel lens having a non-uniform dielectric constant.

13. A miniature phased array antenna system as in claim 1 wherein said superstrate comprises a refractive lens.

14. A miniature phased array antenna system as in claim 1 further comprising analog electronic circuitry coupled to each one of said plurality of antenna elements for applying complex weights to incoming antenna signals prior to a summation thereof in order to reconstruct a desired signal and to deconstruct an undesired signal.

15. A miniature phased array antenna electronics module comprising digital electronic circuitry coupled to each one of a plurality of antenna elements for digitizing incoming antenna signals and for applying digital complex weights to the digitized antenna signals prior to a summation thereof in order to reconstruct a desired signal and to deconstruct an undesired signal.

16. A miniature phased array antenna electronics module as in claim 15, wherein said digital electronic circuitry comprises one or more filter elements and temperature control means for maintaining said one or more filter elements at a constant desired temperature.

17. A miniature phased array antenna electronics module as in claim 16, wherein said filter elements comprise surface acoustic wave (SAW) filters.

18. A miniature phased array antenna electronics module as in claim 15, wherein said digital electronic circuitry comprises a digital front end unit for digitizing said incoming antenna signals and temperature control means for maintaining said digital front end unit at a constant desired temperature.

19. A miniature phased array antenna electronics module as in claim 15, wherein said temperature control means comprises one or more temperature controlled ovens, each of which encloses a respective one of said one or more filter elements.

* * * * *